Figure 4:
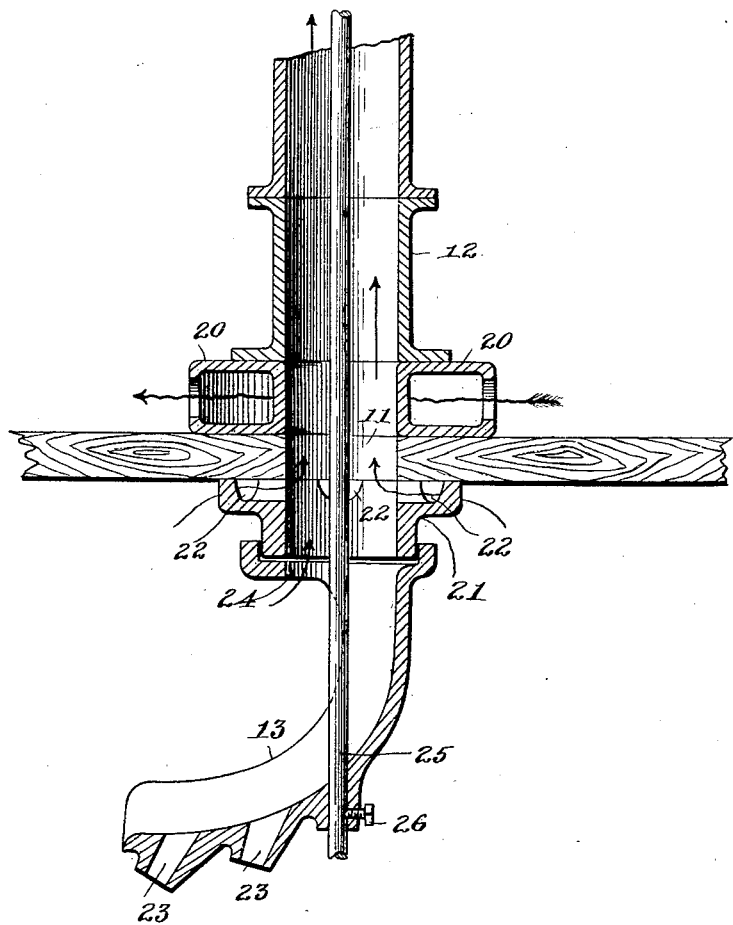

No. 653,738. Patented July 17, 1900.
O. H. & W. M. JEWELL.
APPARATUS FOR PURIFYING WATER.
(Application filed July 6, 1897.)
(No Model.) 2 Sheets—Sheet 1.
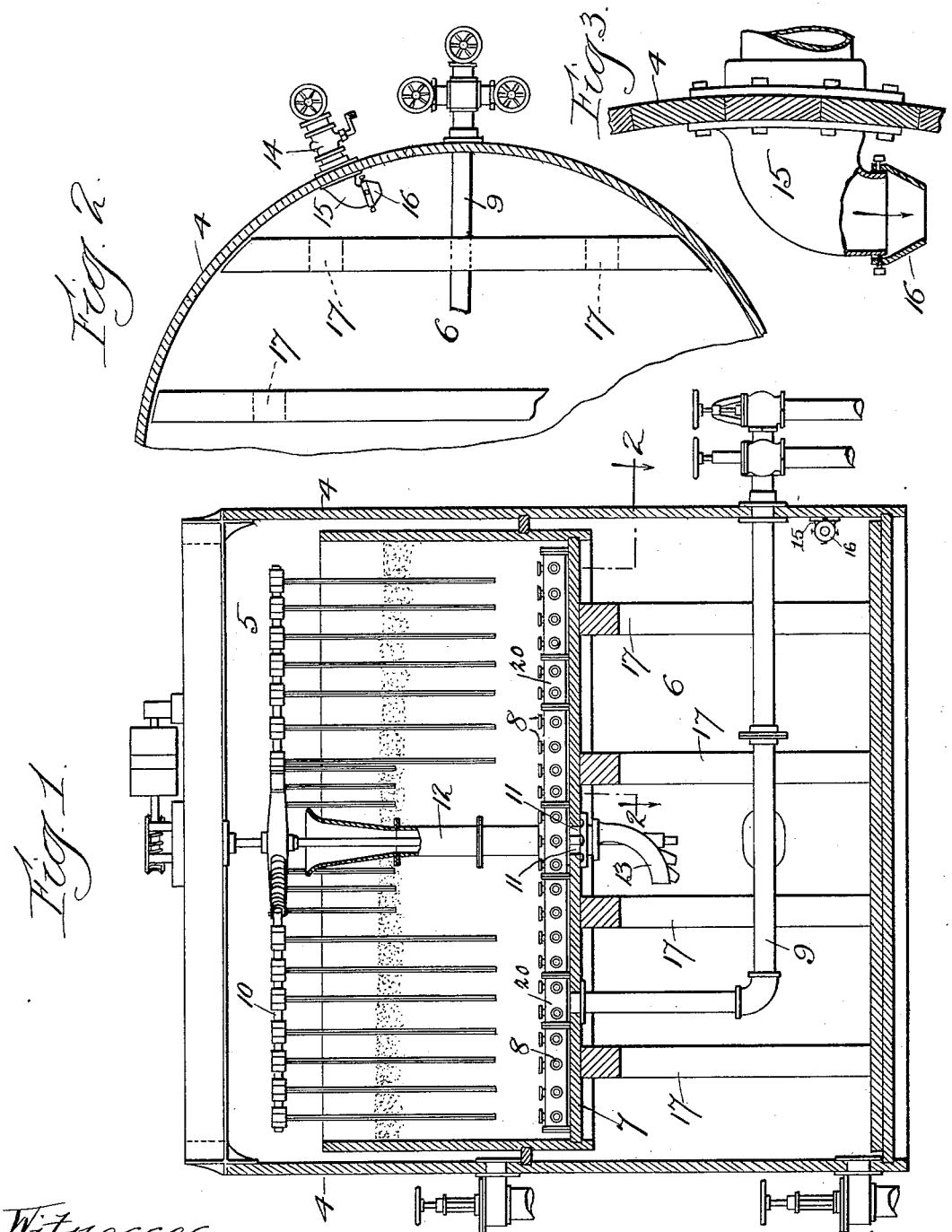
Witnesses
Wm. F. Huning
Holmes A. Tilden.
Inventors.
Omar H. Jewell
William M. Jewell
by Bond Adams Pickard & Jackson
Attys.
THE NORRIS PETERS CO., PHOTO-LITHO., WASHINGTON, D. C.

No. 653,738. Patented July 17, 1900.
O. H. & W. M. JEWELL.
APPARATUS FOR PURIFYING WATER.
(Application filed July 6, 1897.)

(No Model.) 2 Sheets—Sheet 2.

UNITED STATES PATENT OFFICE.

OMAR H. JEWELL AND WILLIAM M. JEWELL, OF CHICAGO, ILLINOIS.

APPARATUS FOR PURIFYING WATER.

SPECIFICATION forming part of Letters Patent No. 653,738, dated July 17, 1900.

Application filed July 6, 1897. Serial No. 643,546. (No model.)

*To all whom it may concern:*

Be it known that we, OMAR H. JEWELL and WILLIAM M. JEWELL, citizens of the United States, residing at Chicago, in the county of Cook and State of Illinois, have invented a certain new and Improved Apparatus for Purifying Water, of which the following is a specification, reference being had to the accompanying drawings.

Our invention relates to the purification of water for potable purposes, and has principally to do with such methods of purification as contemplate the introduction into the water to be purified of a suitable coagulant to coagulate the suspended impurities, and thereby reduce them to such a state as will permit of their being removed from the water by subsequent treatment.

Heretofore it has been customary in purifying water for potable purposes to introduce into the water to be purified a suitable coagulant, such as aluminium sulfate, thereby effecting the necessary coagulation and afterward removing the coagulated impurities by passing the water in which they were suspended through a filter, the process of filtration serving not only to remove the coagulated matter, but also such other suspended impurities as did not pass through the filter-bed.

The process above described has been found to be objectionable in practice, especially where very large quantities of water are to be filtered, owing to the fact that many waters contain large quantities of matters which are coagulated by the chemical treatment to which the water is subjected, and when the water is passed through the filter the retention of the coagulated and other impurities by the filter-bed soon renders the filter-bed so impure and clogs it so much that not only is the water which passes through the filter-bed more or less impure, but the process of filtration is greatly retarded, rendering it necessary to wash out the filter-bed at frequent intervals. The necessity for washing out the filter-beds makes the operation of such filters quite expensive, as, aside from the labor of washing the bed, considerable delay is caused, thereby necessitating a larger plant than would otherwise be necessary in order to maintain the volume of water filtered at a given point. It has heretofore been attempted to avoid the objections above pointed out by providing settling-basins into which the water was conducted after treatment with the chemical, but before filtration, the object of such basins being to permit the coagulated matter to be deposited before the water entered the filter-tank, and consequently avoid the deposition of such coagulated matter in the filter-bed. Such processes have heretofore been found to be unsatisfactory, as in practice the coagulated matter has not separated itself from the liquid to any material extent. Consequently so far as the necessity of washing the filter-bed has been concerned such process has been no substantial improvement over what had gone before. We have discovered, however, that the failure of the last-described process has been due to the fact that in such process the water introduced into the settling-chamber has been allowed to remain practically quiescent, and as the coagulated impurities have been in an extremely finely divided state they have not been deposited, but have remained suspended in the water, and, further, that if the water in the settling-chamber be given a gentle circulatory motion the particles of coagulated matter will be caused to flocculate or to gather together into larger more compact bodies, and that by continuing such movement of the water for a short period of time the coagulated matter may be agglomerated to such an extent as to cause it to be precipitated to the bottom of the settling-tank. The movement which we have found to give the best results is substantially a gentle whirling movement, best caused by directing the inflowing water into the settling-chamber tangentially through a suitable nozzle discharging into the lower part thereof; but such movement may also be communicated to the water by other suitable means—such, for instance, as by revolving a suitable vane or paddle within the tank. Such movement should not, however, be violent, as otherwise the collected impurities would be caused to break up again or the settlement of the impurities would be interfered with. The agglomeration of the coagulated impurities is further promoted by establishing auxiliary circulatory currents, this being effected in the apparatus illustrated by upright posts or equivalent obstructions arranged in the sedimentation-chamber, as hereinafter described, so that the inflowing water coming in contact with such posts is deflected, establishing the auxiliary currents. By establishing such currents the coagulated matter is agglomerated or gathered into relatively-large masses which settle more readily than the smaller flocks originally formed. To further promote sedimentation of the agglomerated matter, the water in the upper part of the settling-chamber is not given much movement, the agglomeration being effected almost entirely in the lower part of said chamber. By thus allowing the water at and near the top to remain comparatively still the separated impurities are allowed to settle more rapidly than they would if the entire body of water were to have considerable motion.

By the use of apparatus operating as above described we have found by experiment on a practical scale that seventy-five per cent. of the coagulated impurities may readily be removed from the water in the settling-chamber before it enters the filter-tank, thus relieving the filter-bed of at least three-fourths of the impure matter which otherwise it would retain. It is evident, therefore, that with such apparatus the washing of the filter-bed would be necessary only about one-fourth as often as in cases where the coagulated matter is removed by filtration.

In the accompanying drawings we have shown one form of apparatus embodying our invention; but it should be understood that we do not restrict ourselves to the use of the specific apparatus there shown, as various modifications may be made.

Referring to the drawings, Figure 1 is a sectional view of a filter-tank. Fig. 2 is a horizontal section of a part of the tank, being on line 2 2 of Fig. 1. Fig. 3 is an enlarged detail of the inlet-nozzle, and Fig. 4 is a sectional view illustrating the inflow-pipe and its nozzle and one of the pipes of the strainer system.

In the apparatus shown in the drawings, 4 indicates a filter-tank which contains two compartments, the upper compartment 5 carrying the filter-bed and the lower compartment 6 being a settling-chamber arranged under the filter-bed. A floor 7 separates the two compartments.

8 indicates a number of strainers which are carried by and communicate with a system of strainer-pipes 20, which rest on the floor 7 of the filter-chamber 5 and communicate with an outlet-pipe 9. The filter-bed, which is of quartz or other suitable material, covers the strainer system in the usual way, and may be of any desired depth.

10 indicates agitating devices for use in washing the filter-bed.

11 indicates a passage through the floor 7 of the filter-chamber, preferably at the center thereof.

12 indicates a pipe which is placed over the passage 11, preferably resting on one of the strainer-pipes 20, as shown in Fig. 4. The pipe 12 rises through the filter-bed, and its upper end is a short distance above the upper edge of the filter chamber or compartment 5, as shown in Fig. 1. The upper end of the pipe 12 is flared in order to better adapt it to receive and discharge the water. The pipes 12 and 20 are closely joined by cement or other suitable means to prevent leakage, and the same is true of the pipe 20 and floor 7.

21 indicates a collar placed around the passage 11 below the floor 7, said collar having lateral passages 22, which admit water from the settling-chamber 6 to the passage 11 and pipe 12, as indicated by the arrows in Fig. 4.

13 indicates a curved nozzle which is fitted on the lower end of the collar 21 and is adapted to rotate thereon. The nozzle is provided with auxiliary passages 23, which discharge downward, and with a passage 24, which permits water to flow into the collar 21 from the settling-chamber. The nozzle 13 is supported and rotated by a rod 25, depending from the agitating devices 10, as shown in Fig. 4, the nozzle being removably secured to said rod by a set-screw 26.

The parts above described, except the flaring nozzle, are all old and are not separately claimed herein.

14 indicates the fresh-water inlet-pipe, which opens into the lower part of the settling-chamber 6, where it is provided with a nozzle 15, arranged to discharge the water from the pipe 14 into the settling-chamber 6 tangentially. The nozzle 15 has a removable nose 16, so that the size of the discharge-orifice may be varied, according to the specific gravity of the impurities, to regulate the speed of rotation or circulation given to the water in the settling-chamber.

17 indicates vertical beams which rise through the settling-chamber at various points and in the construction shown support horizontal beams upon which the floor 7 of the filter-chamber 5 is carried. The water introduced into the settling-chamber is given initially a circulatory movement, owing to the disposition of the inlet-nozzle, and consequently under the influence of the stream from the nozzle the water in the lower part of the settling-chamber flows around said chamber in a more or less spiral path. Such flow, however, does not extend in any considerable measure to the water in the upper part of the settling-chamber, as the effect of the inflowing stream is almost entirely lost before the upper part of the body of water is affected. The water in the upper part of the chamber being comparatively quiet, the agglomerated impurities are not held in suspension, but are allowed to settle quickly, so that they are not carried into the filter-chamber with the water flowing thereinto from the settling-chamber. The vertical posts in the settling-chamber materially promote the agglomeration of the coagulated impurities, as by the flow of water around them additional circulatory currents having smaller paths are established, in the smaller vortexes of which the particles of coagulated matter are brought closer together, thereby inducing their agglomeration into larger, as well as more compact, masses, which have less buoyancy and are precipitated more quickly, especially when reaching the more quiet water in the upper part of the settling-chamber.

The filter-chamber 5 is supplied from the settling-chamber, the water rising through the passages 22, 24, and 11 and passing up through pipe 12 to the filter-chamber 5, into which it is discharged above the filter-bed, and as the water at the upper part only of the settling-chamber can flow into the filter-tank a very small proportion of the coagulated impurities is carried up to be retained by the filter-bed. The sediment deposited in the settling-chamber may readily be washed out when desired.

The reagent to be used is preferably introduced into the water before it enters the settling-chamber 6; but it may be introduced into said settling-chamber, if desired.

That which we claim as our invention, and desire to secure by Letters Patent, is—

1. In a water-purifying apparatus, the combination of a settling-chamber, an inlet through which water is introduced tangentially thereinto, and one or more posts in said chamber, as and for the purpose set forth.

2. In a water-purifying apparatus, the combination with a filter, of a settling-chamber adapted to receive the water before filtration, means for conducting water to be filtered from said settling-chamber to the filter and means for imparting a circulatory motion to the water in the lower part of the settling-chamber, substantially as described.

3. In a water-purifying apparatus, the combination with a filter, of a settling-chamber adapted to receive the water before filtration, means for conducting water to be filtered from said settling-chamber to the filter, an inlet-pipe arranged to discharge the inflowing water into the lower part of the settling-chamber in a substantially-tangential direction, and stationary devices in said settling-chamber for establishing auxiliary currents therein, substantially as described.

4. In a water-purifying apparatus, the combination with a filtering-tank, containing a filter-bed, of a settling-chamber arranged below the filter-bed, a pipe 12 having a flaring upper end extended above the filter-bed and a nozzle upon its lower end extending into the settling-chamber, and means for injecting water tangentially into the lower part of the settling-chamber, substantially as described.

5. In a water-purifying apparatus, the combination of a filter-tank, a settling-chamber arranged below said tank, means for conducting water from said settling-chamber to said filter-tank above the filter-bed, means for injecting water into the lower part of said settling-chamber to establish a circulatory current therein, and means within said settling-chamber for establishing auxiliary currents therein, as and for the purposes set forth.

OMAR H. JEWELL.
WILLIAM M. JEWELL.

Witnesses:
ALBERT H. ADAMS,
JULIA M. BRISTOL.